US008681700B2

(12) United States Patent
Uchida

(10) Patent No.: US 8,681,700 B2
(45) Date of Patent: Mar. 25, 2014

(54) SYSTEM AND METHOD FOR EXECUTED FUNCTION MANAGEMENT AND PROGRAM FOR MOBILE TERMINAL

(75) Inventor: Kaoru Uchida, Tokyo (JP)

(73) Assignee: NEC Corporation, Tokyo (JP)

( * ) Notice: Subject to any disclaimer, the term of this patent is extended or adjusted under 35 U.S.C. 154(b) by 317 days.

(21) Appl. No.: 13/121,226

(22) PCT Filed: Sep. 24, 2009

(86) PCT No.: PCT/JP2009/066556
§ 371 (c)(1),
(2), (4) Date: Mar. 28, 2011

(87) PCT Pub. No.: WO2010/038650
PCT Pub. Date: Apr. 8, 2010

(65) Prior Publication Data
US 2011/0176451 A1 Jul. 21, 2011

(30) Foreign Application Priority Data
Sep. 30, 2008 (JP) .................................. 2008-253699

(51) Int. Cl.
H04W 4/00 (2009.01)
(52) U.S. Cl.
USPC ........................................ 370/328; 455/550.1
(58) Field of Classification Search
None
See application file for complete search history.

(56) References Cited

U.S. PATENT DOCUMENTS

| 2003/0134623 A1* | 7/2003 | Kanamaru et al. ............. 455/414 |
| 2004/0127214 A1* | 7/2004 | Reddy et al. ................ 455/426.2 |
| 2007/0165654 A1* | 7/2007 | Chai et al. ..................... 370/401 |

FOREIGN PATENT DOCUMENTS

| JP | 2000201223 A | 7/2000 |
| JP | 2005123670 A | 5/2005 |
| JP | 2006109238 A | 4/2006 |
| JP | 2006245929 A | 9/2006 |
| JP | 2007172221 A | 7/2007 |
| JP | 2007233661 A | 9/2007 |
| JP | 2007-286776 A | 11/2007 |
| JP | 2007-299284 A | 11/2007 |
| JP | 2007318454 A | 12/2007 |
| JP | 2008027042 A | 2/2008 |
| JP | 2008-71085 A | 3/2008 |
| JP | 2008-112389 A | 5/2008 |
| JP | 2008136194 A | 6/2008 |
| JP | 2008172683 A | 7/2008 |

OTHER PUBLICATIONS

International Search Report for PCT/JP2009/066556 mailed Dec. 22, 2009.
Japanese Office Action for JP Application No. 2010-531817 mailed on Jun. 14, 2013 with English Translation.

* cited by examiner

Primary Examiner — Bob Phunkulh
(74) Attorney, Agent, or Firm — Sughrue Mion, PLLC

(57) ABSTRACT

An executed function management system of a mobile terminal, includes a mobile phone terminal configured to store an execution history when an execution history target function, whose execution history should be stored, as one of functions is executed; and a server unit configured to acquire said execution history from the mobile phone terminal to store for every the mobile phone terminal. The mobile phone terminal notifies the execution history to the server unit at said preset timing or when a notice of said execution history is requested from said server unit.

21 Claims, 10 Drawing Sheets

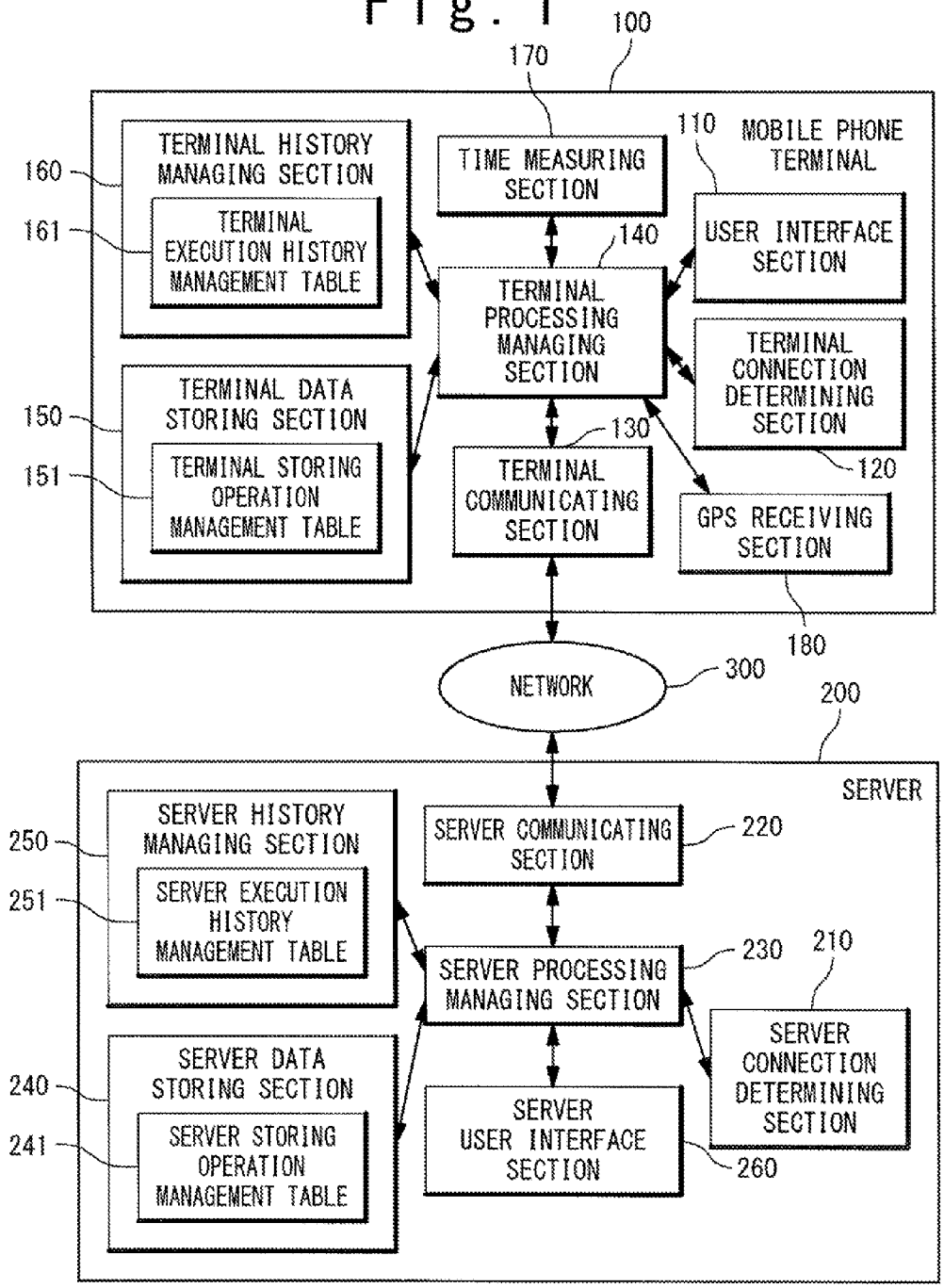

Fig. 2

| FUNCTION NO. 301 | FUNCTION 302 | OPERATION 303 | DETAILED OPERATION/ DL APPLICATION CODE 304 | IMMEDIATE NOTICE 305 | HISTORY TARGET 306 | UPDATE 307 |
|---|---|---|---|---|---|---|
| 1 | CAMERA | TERMINAL SAVING | IMAGING & TERMINAL SAVING | 0 | 1 | 1 |
| 2 | CAMERA | SERVER SAVING | IMAGING & SERVER SAVING | 0 | 0 | 0 |
| 3 | GAME APPLICATION A | EXECUTION | APPLICATION CODE | 0 | 1 | 1 |
| 4 | SD CARD READ | | SD CARD READ | 0 | 0 | 0 |
| 5 | SD CARD WRITE | | SD CARD WRITE | 1 | 1 | 0 |
| 6 | DIGITAL TERRESTRIAL BROADCASTING | VIEWING/ RECORDING | | 0 | 1 | 1 |
| 7 | BROWSER | EXECUTION | BROWSE WEB SITE THROUGH BROWSER | 0 | 0 | 0 |
| 8 | BUSINESS APPLICATION | EXECUTION | STAFF APPLICATION CODE | 1 | 1 | 0 |
| · | · | · | · | · | · | · |
| · | · | · | · | · | · | · |
| · | · | · | · | · | · | · |

Fig. 3

| HISTORY NO. | FUNCTION | OPERATION | DETAILED OPERATION/ DL APPLICATION CODE | EXECUTION TIME | EXECUTION LOCATION |
|---|---|---|---|---|---|
| 1 | CAMERA | TERMINAL SAVING | IMAGING & TERMINAL SAVING | T1 | L1 |
| 2 | GAME APPLICATION A | EXECUTION | APPLICATION CODE | T2 | L2 |
| 3 | DIGITAL TERRESTRIAL BROADCASTING | VIEWING/ RECORDING | APPLICATION CODE | T3 | L3 |
| · | · | · | · | · | · |
| · | · | · | · | · | · |
| · | · | · | · | · | · |

| HISTORY NO. 3011 | FUNCTION 3021 | OPERATION 3031 | DETAILED OPERATION/ DL APPLICATION CODE 3041 | EXECUTION TIME 3051 | EXECUTION LOCATION 3061 |
|---|---|---|---|---|---|
| 1 | CAMERA | TERMINAL SAVING | IMAGING & TERMINAL SAVING | 0 | 1 |
| 2 | CAMERA | SERVER SAVING | IMAGING & SERVER SAVING | 0 | 0 |
| 3 | GAME APPLICATION A | EXECUTION | APPLICATION CODE | 0 | 1 |
| 4 | SD CARD READ | | SD CARD READ | 0 | 0 |
| 5 | SD CARD WRITE | | SD CARD WRITE | 1 | 1 |
| 6 | DIGITAL TERRESTRIAL BROADCASTING | VIEWING/ RECORDING | | 0 | 1 |
| 7 | BROWSER | EXECUTION | BROWSE WEB SITE THROUGH BROWSER | 0 | 0 |
| 8 | BUSINESS APPLICATION | EXECUTION | STAFF APPLICATION CODE | 1 | 1 |
| . | . | . | . | . | . |
| . | . | . | . | . | . |
| . | . | . | . | . | . |

Fig. 5

| HISTORY NO. 4011 | TERMINAL ID 4021 | FUNCTION 4031 | OPERATION 4041 | DETAILED OPERATION/ DL APPLICATION CODE 4051 | EXECUTION TIME 4061 | EXECUTION LOCATION 4071 | BUSINESS FLAG 4081 |
|---|---|---|---|---|---|---|---|
| 1 | I1 | CAMERA | TERMINAL SAVING | IMAGING & TERMINAL SAVING | T1 | L1 | 1 |
| 2 | I2 | GAME APPLICATION A | EXECUTION | APPLICATION CODE | T2 | L2 | 0 |
| 3 | I3 | DIGITAL TERRESTRIAL BROADCASTING | VIEWING/ RECORDING | APPLICATION CODE | T3 | L3 | 1 |
| · | · | · | · | · | · | · | · |
| · | · | · | · | · | · | · | · |
| · | · | · | · | · | · | · | · |

Fig. 7

| FUNCTION NO. 501 | FUNCTION 502 | OPERATION 503 | DETAILED OPERATION/DL APPLICATION CODE 504 | PROHIBITION 505 | IMMEDIATE NOTICE 506 | HISTORY TARGET 507 | UPDATED 508 |
|---|---|---|---|---|---|---|---|
| 1 | WEB BROWSING CATEGORY A | WEB BROWSING | WEB BROWSING CATEGORY A (SAFE SITE) | 0 | 0 | 0 | 0 |
| 2 | WEB BROWSING CATEGORY B | DATA TRANSMISSION | WEB BROWSING CATEGORY B (MIDDLE LEVEL) | 0 | 0 | 1 | 1 |
| 3 | WEB BROWSING CATEGORY C | WEB BROWSING | WEB BROWSING CATEGORY C (INADEQUATE SITE) | 1 | 0 | 0 | 0 |
| 4 | GAME APPLICATION A | EXECUTION | APPLICATION CODE | 0 | 0 | 1 | 1 |
| 5 | GAME APPLICATION B | EXECUTION | APPLICATION CODE | 1 | 1 | 0 | 0 |
| 6 | DIGITAL TERRESTRIAL BROADCASTING | VIEWING/ RECORDING |  | 0 | 0 | 1 | 1 |
| · | · | · | · | · | · | · | · |
| · | · | · | · | · | · | · | · |
| · | · | · | · | · | · | · | · |

Fig. 8

| HISTORY NO. | FUNCTION | OPERATION | DETAILED OPERATION/DL APPLICATION CODE | EXECUTION TIME | EXECUTION LOCATION | EXECUTION SITE DATA | DETAILED DATA |
|---|---|---|---|---|---|---|---|
| 1 | WEB BROWSING CATEGORY B | DATA TRANSMISSION | WEB BROWSING CATEGORY B (MIDDLE LEVEL) | T1 | L1 | U1 | TRANSMISSION ** |
| 2 | GAME APPLICATION A | EXECUTION | APPLICATION CODE | T4 | L4 | U4 | GAME CONTENTS |
| 3 | DIGITAL TERRESTRIAL BROADCASTING | VIEWING/ RECORDING | | T6 | L6 | U6 | PROGRAM NAME |
| · | · | · | · | · | · | · | · |
| · | · | · | · | · | · | · | · |
| · | · | · | · | · | · | · | · |

| FUNCTION NO. | FUNCTION | OPERATION | DETAILED OPERATION/DL APPLICATION CODE | PROHIBITION | IMMEDIATE NOTICE | HISTORY TARGET |
|---|---|---|---|---|---|---|
| 1 | WEB BROWSING CATEGORY A | WEB BROWSING | WEB BROWSING CATEGORY A (SAFETY LEVEL SITE) | 0 | 0 | 0 |
| 2 | WEB BROWSING CATEGORY B | DATA TRANSMISSION | WEB BROWSING CATEGORY B (MIDDLE SAFETY LEVEL SITE) | 0 | 0 | 1 |
| 3 | WEB BROWSING CATEGORY C | WEB BROWSING | WEB BROWSING CATEGORY C (INADEQUATE SITE) | 1 | 0 | 0 |
| 4 | GAME APPLICATION A | EXECUTION | APPLICATION CODE | 0 | 0 | 1 |
| 5 | GAME APPLICATION B | EXECUTION | APPLICATION CODE | 1 | 1 | 0 |
| 6 | DIGITAL TERRESTRIAL BROADCASTING | VIEWING/ RECORDING | | 0 | 0 | 1 |
| . | . | . | . | . | . | . |
| . | . | . | . | . | . | . |
| . | . | . | . | . | . | . |

| HISTORY NO. 6011 | TERMINAL ID 6021 | FUNCTION 6031 | OPERATION 6041 | DETAILED OPERATION/DL APPLICATION CODE 6051 | EXECUTION TIME 6061 | EXECUTION LOCATION 6071 | SITE DATA 6081 | DETAILED DATA 6091 |
|---|---|---|---|---|---|---|---|---|
| 1 | I1 | WEB BROWSING CATEGORY B | DATA TRANSMISSION | WEB BROWSING CATEGORY B (MIDDLE LEVEL) | T1 | L1 | U1 | TRANSMISSION ** |
| 2 | I2 | GAME APPLICATION A | EXECUTION | APPLICATION CODE | T4 | L4 | U4 | GAME CONTENTS |
| 3 | I3 | DIGITAL TERRESTRIAL BROADCASTING | VIEWING/RECORDING |  | T6 | L6 | U6 | PROGRAM NAME |
| · | · | · | · | · | · | · | · | · |
| · | · | · | · | · | · | · | · | · |
| · | · | · | · | · | · | · | · | · |

SYSTEM AND METHOD FOR EXECUTED FUNCTION MANAGEMENT AND PROGRAM FOR MOBILE TERMINAL

TECHNICAL FIELD

The present invention is related to a management system for a function executed in a mobile terminal, and in particular, to a management system which can manage a function executed even if a mobile terminal is in the outside of a wireless area.

BACKGROUND ART

Mobile phone terminals are lent to employees for business in many companies. In recent years, the mobile phone terminals have become more multifunctional and various applications can be used on the mobile phone terminals. Therefore, the employees can attend efficiently to their business by using the mobile phone terminals. On the other hand, depending on how to use the mobile phone terminals, there is risk of confidential information being leaked. Also, according to the multifunction of mobile phone terminals, the employees may end up using functions and applications of the mobile phone terminals that are in no relation to their works during business hours. Therefore, in general, companies have a regular usage policy which determines how to use mobile phone terminals for business by employees. Companies can avoid the above problems such as information leakage by enforcing employees to use mobile phone terminals for business in accordance with a usage policy.

However, whether or not such a usage policy is appropriately observed is dependent on consciousness and conscience of employees. Therefore, there is a risk of the usage policy being violated because of inappropriate use by malicious employees and/or inappropriate use caused by careless behaviors of employees. However, even if there is violation of the usage policy, it is impossible for the companies to achieve effective results without having a system to confirm and verify violation. In order to solve such problems, related techniques are disclosed as follows.

JP 2007-172221A discloses a quarantine system in which a terminal operation by a user is confirmed and if a rule determined by an administrator is violated, access to intra-company resource by the user is prohibited. The quarantine system according to JP 2007-172221A is configured from a terminal and a quarantine device connected to the terminal through a network. The quarantine device is provided with a log memory section, a rule memory section, a log collection managing section, a log data reading section, a log collator section, and a communication control section. The log memory section stores log data including operations executed in a terminal and data of a user identifier. The rule memory section stores rule data showing operations to a detection target. The log collection managing section receives log data from a terminal and writes it in the log memory section. The log data reading section reads, log data written by the log collection managing section from the log memory section. If the log data read out by the log data reading section indicates execution of an operation included in the rule data which is stored in the rule memory section, the rule collator section determines matching between the log data and a rule. The communication control section instructs the user terminal, which is specified by the user identifier shown in result data, to make a communication control for restricting and/or expanding a communication range in accordance with the rule that is determined as matching by the rule collator section. According to the quarantine system of JP 2007-172221A, by performing a compliance check for user operations, endpoint security can be enhanced.

JP 2007-233661A discloses a log integrated management system, in which in an organization such as company, useful data can be provided for mainly internal control by managing the history of actions and operations by a member unit including physical actions along time series. The log integrated management system according to JP 2007-233661A allows integrated management by collecting logs from actions of members in the organization. The log integrated management system includes a first reception section, a second reception section, a third reception section, a memory section and a storage section. The first reception section receives first log data in which a first identification code of a member is collected in a key, in a security gate arranged to enter and exit the office. The second reception section receives second log data in which a second identification code of a member is collected in a key in a computer authorized for the member to operate. The third reception section receives third log data in which a third identification code of a member is collected in a key, in a computer network authorized to connect by the member. The memory section stores an integrated identification code to identify a member in related to the first identification code, the second identification code and the third identification code at least. The storage section stores the first log data, the second log data and the third log data as an integrated log with a standardized format in a table arranged for each integrated identification code by referring to the memory section. According to the log integrated management system of JP 2007-233661A, respective log data, each of which is collected in a different system, is integrated to manage the history of actions and operations by a member unit including physical actions along time series, whereby detailed actions and operations of each member can be easily understood.

JP 2008-027042A discloses an automatic blog generation system in which the operation history of a mobile phone terminal is stored automatically and the user is allowed to add comments to the stored operation history. The automatic blog generation system of JP 2008-027042A is provided with a mobile phone terminal and a server. The mobile phone terminal displays a history storing setting screen to confirm whether the operation history of a predetermined function is stored, and if it is set to store the operation history of a predetermined function, the operation history is automatically obtained and held. When a predetermined function is operated, the mobile phone terminal displays a confirmation screen to ask whether or not to input comments, and if it is designated to input comments, a comment input screen is displayed. The mobile phone terminal automatically obtains and holds comments inputted in the comment input screen. The server obtains the operation history and comments from the mobile phone terminal and stores them in a blog format. According to the automatic blog generation system of JP 2008-027042A, the operation history of the mobile phone terminal can be stored automatically and a blog can be generated by using operations in the mobile phone terminal as a source.

CITATION LIST

[Patent Literature 1]: JP 2007-172221A
[Patent Literature 2]: JP 2007-233661A
[Patent Literature 3]: JP 2008-027042A

SUMMARY OF THE INVENTION

An object of the present invention is to provide an executed function management system which can manage functions executed in a mobile terminal, and in particular, can manage the functions executed even when the mobile terminal is in the outside of a wireless area.

The executed function management system for the mobile terminal according to the present invention is provided with a mobile phone terminal for storing execution history of an execution history target function which is of functions to be executed and whose execution history should be stored, and a server unit for obtaining the execution history from the mobile phone terminal and storing it for each mobile phone terminal, and the mobile phone terminal notifies the execution history to the server unit at predetermined timing or when it is requested to notify the execution history by the server unit.

An executed function management method for the mobile terminal according to the present invention includes, in an executed function management system for a mobile terminal provided with a terminal and a server unit, includes: storing execution history of an execution history target function which is of functions to be executed, and whose execution history should be stored; acquiring the execution history from the mobile phone terminal to store for each mobile phone terminal; and notifying the execution history to the server unit at predetermined timing or when it is requested by the server unit to notify the execution history.

In an executed function management system for a mobile terminal provided with a terminal and a server unit, a recording medium according to the present invention stores an executed function management program for the mobile terminal which program includes: storing execution history of an execution history target function which is of functions to be executed, and whose execution history should be stored; acquiring the execution history from the mobile phone terminal to store for each mobile phone terminal; and notifying the execution history to the server unit at predetermined timing or when it is requested by the server unit to notify the execution history.

According to the present invention, it is possible to provide the executed function management system which can manage a function executed in the mobile terminal and in particular, can manage the function executed even when the mobile terminal is in the outside of a wireless area.

BRIEF DESCRIPTION OF THE DRAWINGS

The above object, effects and features of the present invention will be more clarified from descriptions of exemplary embodiments in cooperation with accompanying drawings.

FIG. 1 is a block diagram showing a configuration of an executed function management system for a mobile terminal in a first exemplary embodiment of the present invention;

FIG. 2 shows a terminal storing operation management table 151 in the first exemplary embodiment;

FIG. 3 shows a terminal execution history management table 161 in the first exemplary embodiment;

FIG. 4 shows a server storing operation management table 241 in the first exemplary embodiment;

FIG. 5 shows a server execution history management table 251 in the first exemplary embodiment;

FIG. 7 shows a terminal store operation table 151 in a second exemplary embodiment;

FIG. 8 shows a terminal execution history management table 161 in the second exemplary embodiment;

FIG. 9 shows a server storing operation management table 241 in the second exemplary embodiment; and FIG. 10 shows a server execution history management table 251 in the second exemplary embodiment.

DESCRIPTION OF EXEMPLARY EMBODIMENTS

Figure 6:
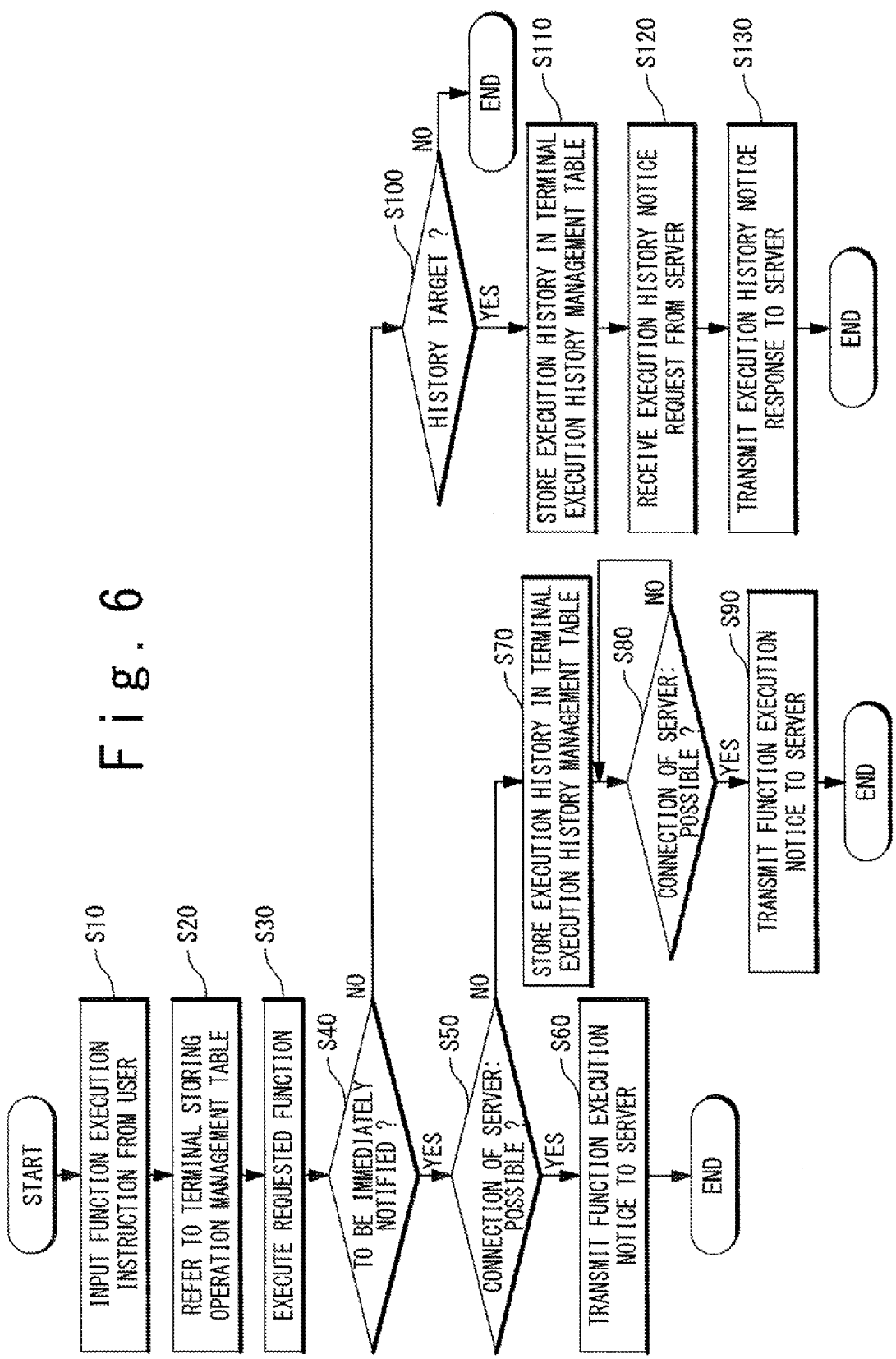
FIG. 6 shows an operation flow of the executed function management system for the mobile terminal in the first exemplary embodiment.

Hereinafter, an executed function management system for a mobile terminal according to the present invention will be described below with reference to the attached drawings.

First Exemplary Embodiment

Firstly, an executed function management system for a mobile terminal according to a first exemplary embodiment of the present invention will be described.
(Configuration)

First of all, a configuration of the executed function management system for a mobile terminal according to the present exemplary embodiment will be described. FIG. 1 is a block diagram showing a configuration of the executed function management system for the mobile terminal according to the present exemplary embodiment. The executed function management system for the mobile terminal according to the present exemplary embodiment is provided with a mobile phone terminal 100, a server (unit) 200 and a network 300.

The network 300 will be described firstly. The network 300 connects communications between the mobile phone terminal 100 and the server 200. The network 300 is a mobile communication network of third-generation mobile phones and/or a high-speed wireless access network represented by WiMA (Worldwide Interoperability for Microwave Access) and wireless LAN (Local Area Network). Also, the network 300 may further include the Internet. More specifically, the mobile phone terminal 100 can communicate with the server 200 through the Internet by using the mobile communication network and/or the high-speed wireless access network. As long as the network 300 can connect communications between the mobile phone terminal 100 and the server 200, a configuration thereof is not limited.

Next, the mobile phone terminal 100 will be described. The mobile phone terminal 100 notifies the server 200 of execution history of each of functions executed in the mobile phone terminal 100 by a user of the mobile phone terminal 100. The mobile phone terminal 100 is provided with a terminal user interface section 110 (to be also referred to as a terminal UI section 110 hereinafter), a terminal connection determining section 120, a terminal communicating section 130, a terminal processing managing section 140, a terminal data storing section 150, a terminal history managing section 160, a time measuring section 170, and a GPS (Global Positioning System) receiving section 180.

At first, the terminal UI section 110 is an input/output interface for the user who uses the mobile phone terminal 100. The terminal UI section 110 includes an input section such as a ten-key for receiving an input from the user, a display section such as an LCD (Liquid Crystal Display) display for displaying image data and text data, and an audio input/output section such as microphone and speaker for inputting and outputting audio data (though these section are not shown). The terminal UI section 110 is connected to the terminal processing managing section 140 and capable of receiving and outputting input data and output data from and to the terminal processing managing section 140. The terminal UI section 110 outputs a command and data inputted to the input section by the user to the terminal processing managing section 140. The terminal UI section 110 also outputs data inputted from the terminal processing managing section 140 to the display section and the audio input/output part.

Next, the terminal communicating section 130 is connected to the network 300 to communicate with the server 200. The terminal communicating section 130 includes an antenna and/or a wireless transmitting/receiving section (not shown) for realizing wireless communications with the network 300 that can be the mobile network and/or the high-speed wireless access network. The terminal communicating section 130 can also communicate with the server 200 through the network 300 by using a communication protocol used in the network 300.

Next, the time measuring section 170 measures a current time. The time measuring section 170 answers the current time in response to an inquiry of time from the terminal processing managing section 140.

Next, the GPS receiving section 180 is a GPS module provided with an antenna for receiving radio waves from a satellite. The GPS receiving section 180 measures positional data of the mobile phone terminal 100. The GPS receiving section 180 answers current positional data in response to an inquiry of positional data from the terminal processing managing section 140.

Next, the terminal connection determining section 120 determines whether or not a connection for communication with the server 200 is possible (to be referred to as a connection possibility determination hereinafter). The terminal connection determining section 120 carries out communication connection possibility determination based on a confirmation result of a connection to the server 300 through the terminal communicating section 130. More specifically, the terminal connection determining section 120 transmits a connection confirmation request to the server 200 through the terminal communicating section 130. The server 300 replies a connection confirmation response when the connection confirmation request is received. The terminal connection determining section 120 determines that the connection with the server 200 is possible, when the connection confirmation response can be received. In contrast, the terminal connection determining section 120 determines that the connection with the server 200 is impossible when the connection confirmation response cannot be received due to any defect in the network 130 and/or any defect in the server 300 or any other reasons. The terminal connection determining section 120 may carry out connection possibility determination by transmitting the connection confirmation request in predetermined constant intervals or may carry out the connection possibility determination by transmitting the connection confirmation request when the terminal processing managing section 140 executes the functions. The terminal connection determining section 120 may carry out the connection possibility determination based on an intensity of electric field received by the mobile phone terminal 100. In this case, the terminal connection determining section 120 obtains the intensity of received electric field from the terminal communicating section 130. If the received electric field does not have intensity necessary to realize communications between the terminal communicating section 130 and the network 300 (or in an out-of-service state hereinafter), the terminal connection determining section 120 determines that the connection with the server 200 is impossible. In contrast, if the received electric field has an intensity necessary to realize communications between the terminal communicating section 130 and the network 300 (or in an in-service state hereinafter), the terminal connection determining section 120 determines connecting the server 200 is possible. The terminal connection determining section 120 answers results of the connection possibility determination (i.e. connection possibility or connection impossibility) in response to an inquiry of a connection state sent from the terminal processing managing section 140.

Next, the terminal data storing section 150 stores data for executing the functions of the mobile phone terminal 100. The terminal data storing section 150 has a terminal storing operation management table 151. The terminal storing operation management table 151 stores whether or not to manage each of the functions executed by the terminal processing managing section 140. The terminal storing operation management table 151 is obtained from the server 200 by the terminal processing managing section 140 and stored in the terminal data storing section 150. FIG. 2 shows the terminal storing operation management table 151. Referring to FIG. 2, the terminal storing operation management table 151 includes a function number field 301, a function field 302, an operation field 303, a detailed operation/DL application code field 304 (to be referred to as a detailed operation field 304 hereinafter), an immediate notice field 305, a history target field 306, and an update field 307.

The function number field 301 indicates a function number uniquely allocated to the function which can be executed in the mobile phone terminal 100. The function field 302 indicates a name of the function executed in the mobile phone terminal 100. The operation field 303 indicates an operation in each executed function of the mobile phone terminal 100. The detailed operation field 304 indicates the details of operation of each executed function in the mobile phone terminal 100. As an example, the executed function having the function number "1" corresponds to "camera" in the function field 302, "terminal saving" in the operation field 303, and "imaging & terminal saving" in the detailed operation field 304. That is, the executed function having the function number "1" refers to an operation carried out by using a "camera" of the mobile phone terminal 100 to perform "terminal saving", and refers to an operation to image an object by a camera to save in a storage medium of the mobile phone terminal 100. The function field 302, the operation field 303 and the detailed operation field 304 indicate a classification of each executed function of the mobile phone terminal 100. It should be noted that function classification of the mobile phone terminal 100 by the function field 302, the operation field 303 and the detailed operation field 304 is not limited to this classification method. The function classification of the mobile phone terminal 100 may be changed in accordance with the functions to be managed by the executed function management system for the mobile terminal.

The immediate notice field 305 stores whether or not an executed function needs to be notified immediately to the server 200. If "1" is stored in the immediate notice field 305, the executed function of a function number is immediately notified to the server 200 when it is executed. In contrast, if "0" is stored in the immediate notice field 305, the executed function having the function number is not immediately notified to the server 200 when it is executed. Referring to FIG. 2, the executed function having the function number "1" corresponds to "0" in the immediate notice field 305. Therefore, the executed function having the function number "1" is not immediately notified to the server 200 even if the function is executed by the user. Meanwhile, the executed function of the function number "8" indicates execution of a business application. "1" is stored in the immediate notice field 305 to the executed function having the function number "8". Therefore, the executed function having the function number "8" is notified immediately to the server 200 when the function is executed by the user. Whether or not to notice immediately is determined by an administrator of the executed function management system by referring to whether execution of the function is regarded as important violation of management policy. That is, if the execution of a certain function is possibly regarded as important violation of the management policy, the execution of the function is immediately notified to the server 200.

Next, the history target field 306 stores whether or not it is necessary to store execution history of each function executed in the mobile phone terminal 100. If "1" is set in the history target field 306, the execution history of the executed function of a function number is stored in the terminal history managing section 160 when it is executed. In contrast, if "0" is set in the history target field 306, the execution history of the executed function having the function number is not stored in the terminal history managing section 160 when it is executed. Referring to FIG. 2, in the executed function having the function number "1", "1" is set in the history target field 306. Therefore, the execution history of the executed function having the function number "1" is stored in the terminal history managing section 160 when the function is executed by the user. Meanwhile, the executed function of the function number "7" indicates execution of web browsing by a browser. "0" is set in the history target field 306 for the executed function having the function number "7". Therefore, the execution history of the executed function having the function number "7" is not stored in the terminal history managing section 160 when the function is executed by the user. Whether or not to store the execution history is thus determined by the administrator of the executed function management system by referring to whether execution of the function is regarded as violation of the management policy. That is, if execution of a function is possibly regarded as violation of the management policy, the execution history of the executed function is stored in the terminal history managing section 160.

Next, the update field 307 stores the presence and absence of the execution history which is not notified to the server 200 in the executed function. If "1" is stored in the update field 307, the executed function of a function number indicates the presence of the execution history which is not notified to the server 200. In contrast, if "0" is stored in the update field 307, the executed function having the function number indicates absence of the execution history which is not notified to the server 200. Referring to FIG. 2, in the executed function having the function number "1", "1" is set in the update field 307. Therefore, the executed function having the function number "1" indicates the presence of the execution history which is not notified to the server 200. Meanwhile, the executed function of the function number "5" indicates SD card writing. "0" is set in the update field 307 for the executed function having the function number "5". Therefore, the executed function having the function number "5" indicates absence of the execution history which is not notified to the server 200.

Next, referring to FIG. 1 again, the terminal history managing section 160 stores the execution history of functions executed in the mobile phone terminal 100. The terminal history managing section 160 includes a terminal execution history management table 161. The terminal execution history management table 161 stores the execution history of functions executed in the mobile phone terminal 100. The execution history is stored in the terminal execution history management table 161 by the terminal processing managing section 140. FIG. 3 shows the terminal execution history management table 161. The terminal execution history management table 161 includes a history number field 401, a function field 402, an operation field 403, a detailed operation/DL application code field 404 (to be referred to as a detailed operation field 404), an execution time field 405, and an execution location field 406. The history number field 401 stores a history number given to the execution history in the ascending order in the terminal execution history management table 161. The function field 402, the operation field 403 and the detailed operation field 404 are similar to the function field 302, the operation field 303 and the detailed operation field 304 in the terminal storing operation management table 151, respectively. The function field 402, the operation field 403 and the detailed operation field 404 in the terminal execution history management table 161 are stored based on the function field 302, the operation field 303 and the detailed operation field 304 in the terminal storing operation management table 151, respectively.

Time of execution of the function in the mobile phone terminal 100 is stored in the execution time field 405. The time at which the function is executed is obtained from the time measuring section 170 and stored in the execution time field 405 by the terminal processing managing section 140. Position data obtained from the GPS receiving section 180 regarding execution of each function is stored in the execution location field 406. A location where the function is executed is obtained from the GPS receiving section 180 is stored in the execution location field 406 by the terminal processing managing section 140. Referring to FIG. 3, it is stored that the history number "1" is executed in an execution time "T1" and an execution location "L1".

Here, an example of the management policy is as follows:
Writing data to a SD card is forbidden in the company.
Starting a game is forbidden during business hours.
Imaging by a camera is forbidden in facilities of the company.
Business applications can be executed only in the company.

Even in a situation where such the management policy is provided, with respect to functions corresponding to the above items in the terminal storing operation management table 151, a flag is given in the immediate notice field 305 and the history target field 306, whereby the execution history of the executed functions is stored and/or notified immediately when the functions are executed. Therefore, the administrator can confirm and verify whether or not the executed function is regarded as violation of the management policy based on execution time and execution location that are included in the execution history stored in the mobile phone terminal.

Next, referring to FIG. 1, the terminal processing managing section 140 executes each of the executed functions of the mobile phone terminal 100. The terminal processing managing section 140 executes the functions of the mobile phone terminal 100 based on an execution command from the user sent through the terminal UI section 110. When the function of the mobile phone terminal 100 is executed, by referring to the terminal storing operation management table 151 of the terminal data storing section 150, the terminal processing managing section 140 determines whether the function to be executed is a target of immediate notice or a target to be stored in the execution history. If the function to be executed is the target to be stored in the execution history, the terminal processing managing section 140 stores the execution history in the terminal execution history management table 161 of the terminal history managing section 160 when the function is executed. When the execution history is stored in the terminal execution history management table 161, the terminal processing managing section 140 sets "1" in the update field 307 corresponding to the function in the terminal storing operation management table 151. Therefore, the terminal processing managing section 140 can detect the presence of the execution history which has not been notified to the server 200.

If the function to be executed is a target of immediate notice to the server 200 when the function is executed, the terminal processing managing section 140 sends a function execution notice to the server 200. The function execution notice includes data similar to the data stored in the terminal execution history management table 161 as shown in FIG. 3. When notifying the function execution notice to the server 200, the terminal processing managing section 140 inquires connection possibility determination results to the terminal connection determining section 120. If the connection possibility determination results obtained from the terminal connection determining section 120 indicate that the connection is possible, the terminal processing managing section 140 performs immediate notice to the server 200. In contrast, if the connection possibility determination results obtained from the terminal connection determining section 120 indicate that the connection is impossible, the terminal processing managing section 140 stores the execution history of the executed function in the terminal execution history management table 161 of the terminal history managing section 160. It is because, if the connection possibility determination results indicate that the connection is impossible, the immediate notice outputted by the terminal processing managing section 140 does not reach the server 200 normally. The terminal processing managing section 140 stores "1" in the update field 307 of the function of the terminal storing operation management table 151. Therefore, the terminal processing managing section 140 can detect the presence of the execution history which has not been immediately notified to the server 200.

Thereafter, the terminal processing managing section 140 outputs inquiries periodically to the terminal connection determining section 120, and if the connection possibility determination results indicate a change to a connection possible state, the execution history which has not been immediately notified is notified to the server 200 as the function execution notice. At this time, the terminal processing managing section 140 refers to the terminal storing operation management table 151 and extracts the executed function having "1" in the immediate notice field 305 and "1" in the update field 307. It is because the executed function extracted thus includes the presence of the execution history which is not notified to the server 200 even though it is a target of immediate notice. The terminal processing managing section 140 specifies the execution history of the executed function which is identical to the extracted function from the execution history stored in the terminal execution history management table 161, and notifies it to the server 200 as the function execution notice. Therefore, the mobile phone terminal 100 can precisely notify to the server 200, the function which is executed in an out-of-service state or in a state that the mobile phone terminal cannot communicate with the server 200 due to any other reasons. When the function execution notice is sent to the server 200, the terminal processing managing section 140 deletes the execution history from the terminal execution history management table 161.

It should be noted that, if the executed function having "0" in both the immediate notice field 305 and the history target field 306 in the terminal storing operation management table 151 (i.e. function which is not the target of immediate notice and of storage of the history) is executed, the terminal processing managing section 140 does not stores the execution history in the terminal execution history management table 161 and does not perform the immediate notice to the server 200. It is because the executed function having "0" in both the immediate notice field 305 and the history target field 306 is the function which is not a target to be managed.

When an execution history notice request is received from the server 200, the terminal processing managing section 140 replies the execution history stored in the terminal execution history management table 161 to the server 200 as an execution history notice response. The execution history notice response includes data similar to the data stored in the terminal execution history management table 161 as shown in FIG. 3. After replying the execution history notice response to the server 200, the terminal processing managing section 140 deletes the execution history from the terminal execution history management table 161. Therefore, the mobile telephone terminal 100 can notify the execution history of the function as a target of storage of the history to the server 200.

It should be noted that, in the mobile phone terminal 100, a code number is given to the function executed by the terminal processing managing section 140 for each function. The code number of each function corresponds to the function number stored in the terminal storing operation management table 151. That is, in the mobile phone terminal 100, each executed function can be managed by a unique code corresponding to each executed function. Therefore, the terminal processing managing section 140 can determine, whether or not it is required to store the execution history and transmit the function execution notice by specifying the executed function having the function number corresponding to the code number for the executed function in the terminal storing operation management table 151, when each function is executed.

Next, the server 200 will be described. The server 200 is provided with a server connection, a determining section 210, a server communicating section 220, a server processing managing section 230, a server data storing section 240, a server history managing section 250, and a server user interface section 260 (to be referred to as a server UI section 260 hereinafter).

Firstly, the server UI section 260 is an input/output interface for the administrator who manages the server 200. The server UI section 260 includes an input section such as a keyboard and a mouse for receiving inputs from the administrator, and a display section such as an LCD display for displaying image data and text data (though these sections are not shown). The server UI section 260 is connected to the server processing managing section 230 to perform transmitting/receiving input/output data to/from the server processing managing section 230. The server UI section 260 outputs a command and data inputted to the input section by the administrator to the terminal processing managing section 140. The server UI section 260 also outputs data inputted from the server processing managing section 230 to the display section and an audio input/output section.

Next, the server connection determining section 210 determines a state of connection with the mobile phone terminal 100. When the connection confirmation request is received from the terminal connection determining section 120 of the mobile phone terminal 100, the server connection determining section 210 transmits the connection confirmation response to the mobile phone terminal. As stated above, when the connection confirmation response is received, the terminal connection determining section 120 determines that the communication connection with the server 200 is possible. When the connection confirmation request is received, the server connection determining section 210 stores an identifier of the mobile phone terminal 100 included in the connection confirmation request. The server connection determining section 210 determines that the connection with the mobile phone terminal 100 whose identifier is stored is possible. In contrast, the server connection determining section 210 determines that the connection with the mobile phone terminal 100 whose identifier is not stored is impossible. Here, the identifier of the mobile phone terminal 100 may be any identifier uniquely given to the mobile phone terminal 100, and may use a terminal individual identification number and a telephone number. When the state of connection with the mobile phone terminal 100 is inquired from the server processing managing section 230, the server connection determining section 210 determines whether or not the connection for communication with the mobile phone terminal 100 is possible, depending on whether or not the identifier of the mobile phone terminal 100 included in the connection state inquiry is stored. It should be noted that the server connection determining section 210 may determine whether or not the connection for communication with the mobile phone terminal 100 is possible, by independently transmitting the connection confirmation request to the terminal connection determining section 120 and determining whether or not there is a response from the terminal connection determining section 120.

Next, the server communicating section 220 is connected to the network 300 to communicate with the mobile phone terminal 100. The server communicating section 220 can communicate with the mobile phone terminal 100 through the network 300 by using a communication protocol used in the network 300.

Next, the server data storing section 240 stores a server storing operation management table 241. The server storing operation management table 241 is a master table of the terminal storing operation management table 151 of the mobile phone terminal 100. More specifically, the terminal storing operation management table 151 is stored based on the server storing operation management table. Therefore, the server storing operation management table 241 and the terminal storing operation management table 151 are provided with substantially similar items. FIG. 4 shows the server storing operation management table 241. The server storing operation management table 241 includes a function number field 3011, a function field 3021, an operation field 3031, a detailed operation/DL application code field 3041 (to be referred to as a detailed operation field 3041, hereinafter), an immediate notice field 3051, and a history target field 3061. Contents stored in the fields are similar to those of the terminal storing operation management table 151. For example, the function field 302 corresponds to the function field 3021, and the operation field 303 corresponds to the operation field 3031. Accordingly, repetitive explanation will be omitted. It should be noted that the server storing operation management table 241 does not have a field corresponding to the update field 307 of the terminal storing operation management table 151. It is because the update field 307 is a field to store the fact that the execution history is not notified, as described above. The administrator sets the server storing operation management table 241 after inputting data from the UI section 260 based on the management policy. Contents set in the server storing operation management table 241 are transmitted to the terminal 100 and reflected in the terminal storing operation management table 151. It should be noted that according to the present exemplary embodiment, explanation is, made for the case where a single server storing operation management table 241 is reflected in the terminal storing operation management table used in a plurality of the mobile phone terminals 100. However, a plurality of the server storing operation management tables 241 may be generated for groups formed by the plurality of the mobile phone terminals 100. In this case, the server data storing section 240 generates a group of the mobile phone terminals 100 corresponding to the server storing operation management table 241 and stores identifiers of the mobile phone terminals 100 included in each group. In the mobile phone terminals 100 included in each group, contents of the server storing operation management table 241 corresponding to each group are reflected in the terminal storing operation management table 241. By adopting such a configuration, a different management policy can be applied to the group of the mobile phone terminals 100.

Next, referring to FIG. 1, the server history managing section 250 stores a server execution history management table 251. The server execution history management table 251 stores the history of function execution notified by the mobile phone terminal 100. FIG. 5 shows the server execution history management table 251. The server execution history management table 251 includes a history number field 4011, a terminal identifier field 4021, a function field 4031, an operation field 4041, a detailed operation/DL application code field 4051 (to be referred to as a detailed operation field 4051), an execution time field 4061, an execution location field 4071, and an business flag field 4081. The history number field 4011 stores a history number given in the ascending order to the execution history notified by the mobile phone terminal 100. The terminal identifier field 4021 stores an identifier of the mobile phone terminal 100 notifying the execution history. The terminal identifier field 4021 is stored based on an identifier of the mobile phone terminal 100 as a transmission source, which is included in the function execution notice and/or an execution history notice response transmitting by the mobile phone terminal 100. Contents described in the function field 4031, the operation field 4041, the detailed operation field 4051, the execution time field 4061, and the execution location field 4071 are similar to those of the function field 402, the operation field 403, the detailed operation field 404, the execution time field 405, and the execution location field 406 in the terminal execution history management table 161, respectively. Accordingly, repetitive explanation will be omitted. The function field 4031, the operation field 4041, the detailed operation field 4051, the execution time field 4061 and the execution time field 4071 are stored based on the function execution notice and/or an execution history notice response transmitted from the mobile phone terminal 100. The business flag 4081 indicates whether or not the executed function is executed by the mobile phone terminal 100 in business hours. "1" in the business flag 4081 indicates that the function is executed by the mobile phone terminal 100 in the business hours. In contrast, "0" in the business flag 4081 indicates that it is out of business hours when the function is executed by the mobile phone terminal 100. The business flag 4081 is stored by the terminal processing managing section 140 based on time and location to execute the function. The administrator can determine whether or not the function is executed in the mobile phone terminal 100 in the business hours based on the business flag 4081. It should be noted that the present exemplary embodiment does not refer to a method to monitor violation of the management policy by using the execution history described in the server execution history management table 251. However, the administrator can monitor violation of the management policy not only by the business flag 4081 but also by presetting a determination reference based on the management policy in the server 200, and based on the execution history stored in the server execution history management table 251.

Next, referring to FIG. 1, the server processing managing section 230 executes the functions of the server 200. The server processing managing section 230 receives data inputted from the user through the UI section 260 to set the server storing operation management table 241. The server processing managing section 230 transmits contents stored in the server processing managing table 241 to the mobile phone terminal 100. In the server processing managing table 241, an identifier of the mobile phone terminal 100 to which policy management should be carried out by the server 200 is registered in advance by the administrator. The server processing managing section 230 transmits contents stored in the server storing operation management table 241 to the mobile phone terminal 100 upon registering the mobile phone terminal 100 newly. If the server storing operation management table 241 is present for every group of the plurality of mobile phone terminals 100, the server storing management table 241 corresponding to each group is transmitted to the mobile phone terminals 100 having the identifiers registered in each group. The server processing managing section 230 also obtains the function execution notice from the mobile terminal 100 to store in the server history management table 251. The server processing managing section 230 transmits the execution history notice request to the mobile terminal 100. Timing at which the server processing managing section 230 transmits the execution history notice request may be predetermined time or may be periodical in time intervals. Alternatively, the mobile phone terminal 100 may transmit the execution history spontaneously at predetermined time or in time intervals. When the execution history notice response is received from the mobile phone terminal 100, the server processing managing section 230 stores the execution history included in the execution history notice response, in the server history management table 251. It should be noted that though it is not described according to the present exemplary embodiment that the server processing managing section 230 notifies to the UI section 260 based on the history of function execution by a predetermined method, and the function execution state of the mobile terminal 100. For example, when the function execution notice of the executed function notified immediately is received from the mobile phone terminal 100, the server processing managing section 230 may display on the display section of the UI section 260, an alarm along with an identifier of the mobile phone terminal 100 transmitting the notice.

The configuration of the executed function management system for the mobile terminal according to the present exemplary embodiment will be described. It should be noted that the mobile phone terminal 100 and the server 200 include a ROM (Read Only Memory) for storing a processing program to realize each of the functions described above, a CPU (Central Processing Unit) for executing a processing program, a RAM (Random Access Memory) for temporarily storing the program when the program is executed by the CPU, a memory device such as hard disk and flash memory for storing the above data, and other components. The processing program can also be stored in a recording medium not shown. Here, the recording medium refers to, for example, a CD (Compact Disc), a mobile flash memory and/or a hard disk of application providing server installed on a network, or other devices. The processing program is installed from the recording medium to the mobile phone terminal 100 and/or the server 200.

The mobile phone terminal 100 transmits the function execution notice and the execution history notice to the server 200 based on the terminal storing operation management table 151 set from the server 200. The terminal storing operation management table 151 reflects the server storing operation management table 241 to which the management policy is preset by the administrator. Therefore, the administrator can confirm and verify whether or not the function executed by the user (or employee) is regarded as violation of the management policy based on the execution history of the server execution history management table 251 in which the function execution notice and the execution history notice are stored. If the connection for communication with the server 200 is impossible, the mobile phone terminal 100 stores data including the execution history of the executed function which needs to be notified immediately in the terminal execution history management table 161, and transmits the execution history to the server 200 after the connection for communication with the server 200 becomes possible. According to such a configuration, even the function executed when the communication connection between the mobile phone terminal 100 and the server 200 is impossible, can be confirmed and verified by the administrator.

(Operation Method)

An operating method of an executed function management system in a mobile terminal according to the present exemplary embodiment will be described. FIG. 6 shows an operation flow of the executed function management system for the mobile terminal according to the present exemplary embodiment. It should be noted that the following description is made on the assumption that the administrator sets the server storing operation management table 241 of the server data storing section 240 based on the management policy of the mobile phone terminal 100. Setting of the server storing operation management table 241 is also reflected to the terminal storing operation management table 151 of the mobile phone terminal 100.

(Step S10)

A user inputs a command to execute the function of the mobile phone terminal 100 from the UI section 110 of the mobile phone terminal 100. The UI section 110 detects the function execution command and notifies to the terminal processing managing section 140.

(Step S20)

The terminal processing managing section 140 receives the function execution command. The terminal processing managing section 140 confirms by referring to the terminal storing operation management table 151, whether the function to be executed is a target of immediate notice or storage of the history.

(Step S30)

The terminal processing managing section 140 executes the function in response to the function execution command. The terminal processing managing section 140 obtains current time from the time measuring section 170 and current location data from the GPS receiving section 180, when the function is executed.

(Step S40)

If the terminal storing operation management table 151 indicates that the executed function is not the target of immediate notice, as a result of referring to the terminal storing operation management table 151 at the step S20, the operation flow advances to a step S100. In contrast, if the executed function is the target of immediate notice, the operation flow moves onto a step S50.

(Step S50)

If the executed function is the target of immediate notice, the terminal processing managing section 140 confirms whether or not the connection for communication with the server 200 is possible, in order to transmit the function execution notice. The terminal processing managing section 140 inquires whether the connection for communication with the server 200 is possible at the current time, to the terminal connection determining section 120. The terminal connection determining section 120 periodically carries out the connection possibility determination to the server 200. If the connection confirmation response is received from the server 200 and the connection for communication with the server 200 is possible, the terminal connection determining section 120 notifies the terminal processing managing section 140, that the connection is possible. In this case, the operation flow advances to a step S60. In contrast, if the connection confirmation notice is not received from the server 200 and the connection for communication with the server 200 is impossible, the terminal connection determining section 120 notifies to the terminal processing managing section 140, that the connection is impossible. In this case, the operation flow advances to a step S70.

(Step S60)

The terminal processing managing section 140 receives the notice that the connection for communication with the server 200 is possible, from the terminal connection determining section 120. The terminal processing managing section 140 transmits the function execution notice to the server 200. The function execution notice includes data in the function field 302, the operation field 303 and the detailed operation field 304 corresponding to the executed function and the current time and the current location data which are obtained at the step S30 in the terminal storing operation management table 151 as described in FIG. 2. The server processing managing section 230 of the server 200 receives the function execution notice. The server processing managing section 230 stores data included in the function execution notice in the server execution history management table 251. If it is preset to display with an alarm in the UI section, With regard to execution of the function as the target of immediate notice, the server processing managing section 230 displays based on the settings. The administrator can confirm and inspect whether the function as the target of immediate notice or the function which is possibly regarded as violation of the management policy is executed, based on the function execution notice.

(Step S70)

The terminal processing managing section 140 receives a notice that the connection for communication with the server 200 is impossible, from the terminal connection determining section 120. The terminal processing managing section 140 stores the execution history of the function in the terminal execution history management table 161. As described in FIG. 3, the execution history includes the function field 402, the operation field 403 and the detailed operation field 404 corresponding to the function and current time as well as current position data obtained in the step S30. After the terminal execution history management table 161 stores the execution history of the function, the terminal processing managing section 140 sets the flag "1" in the update field 307 corresponding to the function the terminal storing operation management table 151. Therefore, the function can be detected with the presence of the execution history which is not notified to the server 200.

(Step S80)

The terminal processing managing section 140 periodically inquires to the terminal connection determining section 120, whether or not the connection for communication with the server 200 becomes possible. The terminal connection determining section 120 periodically transmits the connection confirmation request to the server 200. If the connection for communication with the server 200 does not become possible (or communication is not recovered), the terminal connection determining section 120 continuously and periodically transmits the connection confirmation request to the server 200 (or the present step is repeated). Meanwhile, if the connection confirmation request is received from the server 200, the terminal connection determining section 120 determines that the connection for communication with the server 200 becomes possible (or communication is recovered). When the connection for communication with the server 200 becomes possible, the terminal connection determining section 120 replies to the inquiry sent from the terminal processing managing section 140 to notify that the connection is possible. In this case, the operation flow advances onto a step S90.

(Step S90)

When it is notified from the terminal connection determining section 120 that the connection to the server 200 is possible, the terminal processing managing section 140 extracts from the terminal storing operation management table 151, the function having "1" in the history target field 306 and the immediate notice field 305 and "1" in the update field 307 (to be referred to as a non-execution notice function). The terminal processing managing section 140 extracts the execution history of the non-execution notice function from the terminal execution history management table 161. The terminal processing managing section 140 transmits the function execution notice to the server 200, including the execution history of the non execution notice function. The function execution notice includes data similar to those described at the step S60 and repetitive explanation thereof will be omitted accordingly. The terminal processing managing section 140 deletes the execution history of the non-execution notice function to which the function execution notice is issued, from the terminal execution history management table 161. The terminal processing managing table 140 changes to "0" in the terminal storing operation management table 151 in the update field 307 corresponding to the non-execution notice function for which the function execution notice is issued. The server processing managing section 230 of the server 200 receives the function execution notice. The server processing managing section 230 stores data included in the function execution notice in the server execution history management table 251. With regard to execution of the function as the target of immediate notice, when being preset to display an alarm in the UI section, the server processing managing section 230 allows the display based on the settings. The administrator can confirm and inspect, by the function execution notice, whether the function as the target of immediate notice or the function which is possibly regarded as violation of the management policy is executed.

(Step S100)

If the executed function is not the target of immediate notice and the executed function is subjected to store the execution history thereof (or "1" is stored in the history target field 306), the terminal processing managing section 140 allows the process to move onto a step S110. In contrast, if the executed function is not the target to store the history (or "0" is stored in the history target field 306), the present operation method is ended.

(Step S110)

If the executed function is the target to store the execution history, the terminal processing managing section 140 stores the execution history thereof in the terminal execution history management table 161. The execution history includes data similar to those described in the step S70 and repetitive explanation thereof will be omitted accordingly. After the execution history of the function is stored in the terminal execution history management table 161, the terminal processing managing section 140 sets a flag "1" in the update field 307 corresponding to the function in the terminal storing operation management table 151. The function can be therefore detected with the presence of the execution history which is not notified to the server 200.

(Step S120)

The server processing managing section 230 periodically transmits the execution history notice request to the mobile phone terminal 100.

(Step S130)

The terminal processing managing section 140 of the mobile phone terminal 100 receives the execution history notice request. The terminal processing managing section 140 extracts functions with "1" in the history target field 306 and "0" in the immediate notice field 305, the function having "1" in the update field (to be referred to as a non history notice function) from the terminal storing operation management table 151. The terminal processing managing section 140 extracts the execution history of the history non-notification function from the terminal execution history management table 161. The terminal processing managing section 140 transmits the execution history notice response including the execution history of the history non-notification function to the server 200. The execution history notice response includes data similar to those described in the step S60 and repetitive explanation thereof will be omitted accordingly. The terminal processing managing section 140 deletes the execution history of the history non-notification function for which the execution history notice response was carried out from the terminal execution history management table 161. The terminal processing managing, section 140 changes to "0" in the update field 307 corresponding to the history non-notification function included in the execution history notice response in the terminal storing operation management table 151. The server processing managing section 230 of the server 200 receives the execution history notice response. The server processing managing section 230 stores data included in the execution history notice response in the server execution history management table 251. The administrator can confirm and inspect whether the function as the target of storage of the history or function which is possibly regarded as violation of the management policy is executed, based on the execution history notice request and the execution history notice response.

The operation method in the executed function management system for the mobile terminal according to the present exemplary embodiment has been described. The terminal processing managing section 140 determines whether the function to be executed is the target of immediate notice or the target of storage of the history, based on the terminal storing operation management table 151. If the function to be executed is the target of immediate notice and the connection for communication with the server 200 is possible, the terminal processing managing section 140 transmits the function execution notice including execution of the function to the server 200. The server processing managing section 230 stores data included in the function execution notice in the server execution history management table 251 and notifies the execution of the function as an alarm to the UI section 260, if it is preset to do so. The administrator can therefore confirm and verify whether the function executed by the user (or employee) is regarded as violation of the management policy, based on the function execution notice.

If the connection for communication with the server 200 is impossible, the terminal processing managing section 140 stores the execution history of the function as the target of immediate notice in the terminal execution history management table 161, and transmits the execution history to the server 200 after the connection for communication with the server 200 becomes possible. Accordingly, even the function executed when communication connection between the mobile phone terminal 100 and the server 200 is impossible, can be confirmed and verified by the administrator.

If the function which is not the target of immediate notice but the target of storage of the history is executed, the terminal processing managing section 140 further stores the execution history of the function in the terminal execution history management table 161. The terminal processing managing section 140 transmits the execution history notice response including the execution history of the function as the target of storage of the history thereof to the server 200 in response to an execution history notice request sent from the server processing managing section 230. The server processing managing section 230 stores the execution history included in the execution history notice response in the server execution history management table 251. The administrator can therefore confirm and verify the presence and absence of management policy violation by using the history of function execution stored in the server execution history management table 251 for each of the mobile phone terminals 100.

Explanation was made above for the executed function management system for the mobile terminal in the first exemplary embodiment of the present invention.

Second Exemplary Embodiment

The executed function management system for the mobile terminal according to a second exemplary embodiment of the present invention will be described. In the present exemplary embodiment, execution restriction is applied to the function having an effective inhibition flag by providing an inhibition flag in the terminal storing operation management table 151 to a specific operation of the mobile phone terminal 100. In this way, a parent allows a child to have the mobile phone terminal 100, to use an operation to notify an executed function and an operation to restrict execution of a specific function in combination, whereby inappropriate use of the mobile pone terminal 100 can be prevented.

(Configuration)

The configuration of the executed function management system for the mobile terminal according to the present exemplary embodiment will be described. The executed function management system for the mobile terminal according to the present exemplary embodiment has the configuration substantially similar to the configuration described in the first exemplary embodiment. Therefore, explanation will be made here by focusing on portions different from the first exemplary embodiment.

The executed function management system for a mobile terminal according to the present exemplary embodiment has a configuration substantially similar to that of the first exemplary embodiment shown in FIG. 1. The executed function management system for a mobile terminal according to the present exemplary embodiment is provided with, as shown in FIG. 1, the mobile phone terminal 100, the server 200 and the network 300.

Firstly, the mobile phone terminal 100 according to the present exemplary embodiment includes, similar to the first exemplary embodiment, the user interface section 110 (to be referred to as the UI section hereinafter), the terminal connection determining section 120, the terminal communicating section 130, the terminal processing managing section 140, the terminal data storing section 150, the terminal history managing section 160, the time measuring section 170, and the GPS managing section 180. In the mobile phone terminal 100 according to the present exemplary embodiment, differences from the configuration of the first exemplary embodiment are seen in the terminal storing operation management table 151 of the terminal data storing section 150 and the terminal execution history management table 161 of the terminal execution history managing section 160.

FIG. 7 shows the terminal storing operation management table 151 according to the present exemplary embodiment. The terminal storing operation management table 151 according to the present exemplary embodiment includes, similar to the first exemplary embodiment, a function number field 501, a function field 502, an operation field 503, a detailed operation/DL application code field 504 (to be referred to as a detailed operation field hereinafter), an immediate notice field 506, a history target field 507, and an update field 508, and further includes a prohibition field 505. The fields other than the prohibition field 505 are similar to those of the first exemplary embodiment and explanation thereof will be omitted accordingly. The prohibition field 505 indicates a property by which the concerned function of functions of the mobile phone terminal 100 cannot be executed (to be referred to as an execution prohibited function, hereinafter). The function having "1" in the prohibition field 505 cannot be executed. Meanwhile, the function having "0" in the prohibition field 505 can be executed. Referring to FIG. 7, the function of the function number "3" refers to "web browsing category C". This function is a function to browse a website of a category C (i.e. inappropriate website). The inappropriate website is a site specified by the administrator (or a parent). For example, the inappropriate sites are listed in a black list as sites which is provided from an external institution, and should be prohibited from being accessed by children. The examples are not limited to the websites and games specified with PG (Parental Guidance required) 15 can also be considered as an inappropriate application (equivalent to the function number "5"). "1" is stored in the prohibition field 505 to the function having the function number "3". Therefore, the user (or a child) cannot execute the function having the function number "3".

By the above configuration, it is possible to restrict how to use the mobile phone terminal 100 by the user. In the present exemplary embodiment, it is assumed that the administrator is the parent and the user is the child, but similar to the first exemplary embodiment, the present invention can also be applied to a case that the administrator is the company and the user is the employee. It is therefore made possible for employees to appropriately use the mobile phone terminals 100 in accordance with the management policy. It should be noted that the function number "3" indicates the function for which "0" is stored in the immediate notice field 506. However, "1" can also be stored in the immediate notice field 506 for the executed function having the function number "3". When the function having the function number "3" is executed in the mobile phone terminal 100, the terminal process section 130 prohibits execution of the function having the function number "3" and simultaneously transmits the function execution notice to the server 200. The administrator can therefore confirm and understand that the user tried to execute the prohibited function. Furthermore, if the terminal processing managing section 130 transmits to the server 200 the function execution notice with URL (Uniform Resource Locator) of the accessed website, the administrator can confirm what kind of website it is.

Next, FIG. 8 shows the terminal execution history management table 161 according to the present exemplary embodiment. The terminal execution history management table 161 according to the present exemplary embodiment includes, similar to the first exemplary embodiment, a history number field 601, a function field 602, an operation field 603, a detailed operation/DL application code field 604 (to be referred to as a detailed operation field 604 hereinafter), an execution time field 605, and an execution location field 606, and further includes a site data field 607 and a detailed data field 608. The site data field 607 stores URL data of an accessed site. The detailed data field 608 stores "characters" inputted in an accessed site. The administrator can confirm and verify a more detailed use state of the mobile phone terminal 100 by the user based on data in the site data field 607 and the detailed data field 608 of the terminal execution history management table 161.

Next, similar to the first exemplary embodiment, the server 200 according to the present exemplary embodiment includes the user interface section 260, the server connection determining section 210, the server communicating section 220, the server processing managing section 230, the server data storing section 240, and the server history managing section 250. In the server 200 according to the present exemplary embodiment, differences from the configuration of the first exemplary embodiment are seen in the server history management table 251 of the server history managing section 250 and the server storing operation management table 241 of the server data storing section 240.

FIG. 9 shows the server storing operation management table 241 according to the present exemplary embodiment. Similar to the first exemplary embodiment, the server storing operation management table 241 according to the present exemplary embodiment includes a function number field 5011, a function field 5021, an operation field 5031, an entity operation/DL application code field 5041, an immediate notice field 5061, and a history target field 5071, and further includes a prohibition field 5051. A flag stored in the prohibition field 5051 is similar to a flag stored in the prohibition field 505 of the terminal storing operation management table 151, and repetitive explanation thereof will be omitted accordingly. A relation between the terminal storing operation management table 151 and the server storing operation management table 241 is similar to that of the first exemplary embodiment. That is, the server storing operation management table 241 is set by the administrator based on the management policy. The server processing managing section 230 transmits setting contents of the server storing operation management table 241 to the terminal 100. The setting contents of the server storing operation management table 241 are reflected on the terminal storing operation management table 151 by the terminal processing managing section 140. According to such the configuration, it is possible in the mobile phone terminal 100 to prevent the user from executing the function which is regarded as violation of the management policy.

FIG. 10 shows the server execution history management table 251 according to the present exemplary embodiment. Similar to the first exemplary embodiment, the server execution history management table 251 according to the present exemplary embodiment includes a history number field 6011, a terminal identifier field 6021, a function field 6031, an operation field 6041, an entity operation description/DL application code field 6051, an execution time field 6061, and an execution location field 6071, and further includes a site data field 6081 and a detailed data field 6091. The data stored in the site data field 6081 and the detailed data field 6091 are the same as those stored in the site data field 607 and the detailed data field 608 of the terminal execution history management table, and repetitive explanation thereof will be omitted accordingly. The relation between the terminal execution history management table 161 and the server execution history management table 251 is also similar to that of the first exemplary embodiment. That is, the execution history of the terminal execution history management table 161 notified by the function execution notice and/or the execution history notice response sent from the mobile phone terminal 100, is stored in the server execution history management table 251 based on an identifier of the mobile phone terminal 100. The site data 6081 and the detailed data 6091 are stored in the server execution history management table 251 for each of the mobile phone terminals 100, and the administrator can confirm and verify more details of a use state of the mobile phone terminal 100 by the user.

The configuration in the executed function management system for the mobile terminal according to the present exemplary embodiment has been described. The configuration other than the configuration described above remains same as the first exemplary embodiment.

(Operation Method)

An operation method of the executed function management system for the mobile terminal according to the present exemplary embodiment will be described. The operation method in the executed function management system for the mobile terminal according to the present exemplary embodiment is substantially the same as that of the first exemplary embodiment. Therefore, explanation will be made by focusing on differences from the first exemplary embodiment. In the present exemplary embodiment, differences from the operation method of the first exemplary embodiment are seen in the step S20 and the step S30 shown in FIG. 6.

(Step S20)

The terminal processing managing section 140 receives a function execution command. The terminal processing managing section 140 confirms whether the function to be executed is a target of prohibition or the target of immediate notice or the target of storage of the history by referring to the terminal storing operation management table 151.

(Step S30)

The terminal processing managing section 140 executes the function based on the function execution command. Here, if the function to be executed is the target of prohibition as a result of reference to the terminal storing operation management table 151, the terminal-processing managing section 140 does not execute the function. In this case, the terminal processing managing section 140 allows the operation flow to advance to the step S40 without executing the function. In contrast, if the function to be executed is not the target of prohibition, as a result of reference to the terminal storing operation management table 151, the terminal processing managing section 140 executes the function. The terminal processing managing section 140 obtains current time from the time measuring section 170 and current position data from the GPS receiving section 180, when the function is executed. Thereafter, the operation flow advances to the step S40.

Explanation has been made above for the operation method in the executed function management system for the mobile terminal according to the present exemplary embodiment. Other than the aspects described above, the operation method remains same as that of the first exemplary embodiment. The mobile phone terminal 100 is provided with the terminal storing operation management table 151 based on the server storing operation management table 241 which is inputted through the UI section 260 from the administrator. The terminal storing operation management table 151 has a flag stored in the prohibition field 505 based on the management policy set by the administrator. The terminal processing managing section 140 determines whether to actually execute the function, based on a flag stored in the prohibition field 505. Therefore, the administrator can allow the user to use the mobile terminal 100 in accordance with the management policy. It should be noted that the terminal processing managing section 140 may transmit the function execution notice and/or the execution history notice response by including data of prohibition field 505 to the server 200.

Explanation has been made above for the executed function management system for the mobile terminal in the second exemplary embodiment of the present invention.

Here, through the first exemplary embodiment and the second exemplary embodiment, the following changes can also be added. Firstly, in the mobile phone terminal 100, if the connection for communication with the server 200 is determined to be impossible by the terminal connection determining section 120 after the impossible state is continued for more than a predetermined period of time or longer, execution of entire functions or a predetermined specific function may be prohibited. It may be determined based on a flag stored in the prohibition field 505 of the terminal storing operation management table 151 in the second exemplary embodiment or by providing a new item field to determine the function whose execution by the mobile phone terminal 100 is prohibited. Therefore, it is made possible to prevent a malicious user from executing the function which is regarded as violation of the management policy, in a state that the mobile phone terminal. 100 cannot transmit the function execution notice.

In both the first exemplary embodiment and the second exemplary embodiment, the configuration and functions of the server 200 may be provided in another mobile phone terminal 100. For example, the mobile phone terminal 100 which replaces the server 200 (to be referred to as an administration mobile phone terminal 100, hereinafter) is carried by the administrator. According to such a configuration, the administrator can grasp a function execution state of the mobile phone terminal 100 used by the user in real time by using the administration mobile phone terminal 100. The administrator can change settings of the terminal storing operation management table 151 in each of the mobile phone terminals 100 used by the user in real time and change the management policy by using the administration mobile phone terminal 100. In such a configuration, the administration mobile phone terminal 100 is carried by a parent and/or teacher who are the administrator and the other mobile phone terminals 100 are carried by a child and/or a student who is the user, whereby inappropriate use can be restricted, confirmed and verified. In particular, the administrator can prohibit the functions other than a specific function from being used in a school by defining a further detailed application range of the prohibition field 505 based on the position data.

As described above, according to the present invention, it is possible to provide an executed function management system which can manage the function executed in the mobile terminal, and in particular, the function which as executed even if the mobile terminal is in the out-of-are.

Although the present invention has been described with reference to the exemplary embodiments, the present invention is not limited to the exemplary embodiments. Various modifications that can be understood by those skilled in the art can be made in the configuration within the scope of the present invention.

This patent application is the National Phase of PCT/JP2009/066556, filed Sep. 24, 2009, which claims a priority on convention based on Japanese patent application No. 2008-253699 filed on Sep. 30, 2008, and the disclosure thereof is incorporated herein by reference.

The invention claimed is:

1. An executed function management system, comprising:
a mobile phone terminal configured to store an execution history of an execution history target function, which is one of functions of said mobile phone terminal and whose execution history should be stored; and
a server unit configured to acquire said execution history from said mobile phone terminal to store for said mobile phone terminal,
wherein said mobile phone terminal notifies said execution history to said server unit at preset timing or when the notification of said execution history is requested from said server unit, and
wherein said mobile phone terminal comprises:
a terminal storing operation management table in which said execution history of said execution history target function is stored as well as an immediate notice target function whose execution history should be notified to said server unit immediately upon an execution time; and
a terminal execution history management table in which said execution history of said execution history target function is stored,
wherein said mobile phone terminal determines whether said one function of the functions is said execution history target function or said immediate notice target function, based on said terminal storing operation management table, when said one function is executed, stores said execution history in said execution history management table when said one function is said execution history target function, and notifies said execution history to said server unit when said one function is said immediate notice target function.

2. The executed function management system according to claim 1, wherein said mobile phone terminal further comprises:
a terminal communication connection determining section configured to determine whether a communication connection with said server unit is possible or impossible,
wherein said mobile phone terminal stores said execution history of said immediate notice target function in said terminal execution history management table, when said immediate notice target function is executed and when the communication connection with said server unit is impossible upon executing said one function, and extracts said execution history of said immediate notice target function from said terminal execution history management table after the communication connection with said server unit becomes possible, and notifies the extracted execution history to said server unit.

3. The executed function management system according to claim 2, wherein said terminal communication connection determining section determines that a communication connection confirmation response to a communication connection confirmation request transmitted periodically can be received from said server unit, and determines whether the communication connection with said server unit is possible or impossible, based on whether radio wave reception level of said mobile phone terminal is in an inside-of-area state or an outside-of-area state.

4. The executed function management system according to claim 1, wherein said terminal storing operation management table further stores an execution prohibition indication data,
wherein said mobile phone terminal refers to said terminal storing operation management table when an instruction of execution of said one function is received, and neglects the instruction when said one function is a function assigned with said execution prohibition indication data.

5. The executed function management system according to claim 1, wherein said mobile phone terminal further comprises:
a user interface section configured to receive an input from a user of said mobile phone terminal;
a time measuring section configured to measure current time; and
a GPS receiving section configured to acquire current location data,
wherein said execution history comprises at least one of said current time, said current position data, and letters inputted through said user interface section from said user.

6. The executed function management system according to claim 1, wherein said server unit comprises a server storing operation management table in which data for said terminal storing operation management table are stored in relation to said mobile phone terminal,
wherein said mobile phone terminal acquires said server storing operation management table from said server unit and sets said terminal storing operation management table based on the data of said server storing operation management table.

7. The executed function management system according to claim 1, wherein said server unit is built in an administrative mobile phone terminal, and
said execution history is received by said administrative mobile phone terminal.

8. An executed function management method, in an executed function management system comprising a mobile phone terminal and a server unit, said executed function management method comprising:
storing an execution history of an execution history target function, which is one of functions of said mobile phone terminal and whose execution history should be stored;
acquiring said execution history from said mobile phone terminal to store for said mobile phone terminal;
notifying said execution history to said server unit at preset timing or when the notification of said execution history is requested from said server unit;
storing said execution history of an immediate notice target function whose execution history should be notified to said server unit immediately upon an execution time as well as said execution history of said execution history target function in a terminal storing operation management table; and
determining whether said one function of the functions is said execution history target function or said immediate notice target function, based on said terminal storing operation management table, when said one function is executed,
wherein said storing an execution history comprises:
storing said execution history of said one function in said execution history management table when said one function is said execution history target function; and
notifying said execution history of said one function to said server unit when said one function is said immediate notice target function.

9. The executed function management method according to claim 8, further comprising:
determining whether a communication connection with said server unit is possible or impossible;
storing said execution history of said immediate notice target function in said terminal execution history management table, when said immediate notice target function is executed and when the communication connection with said server unit is impossible;
extracting said execution history of said immediate notice target function from said terminal execution history management table after the communication connection with said server unit becomes possible; and
notifying the extracted execution history to said server unit.

10. The executed function management method according to claim 9, wherein said determining whether a communication connection with said server unit is possible or impossible comprises:
determining whether or not a communication connection confirmation response to a communication connection confirmation request transmitted periodically can be received from said server unit, or determining whether the communication connection with said server unit is possible or impossible, based on whether a radio wave reception level of said mobile phone terminal is in an inside-of-area state or an outside-of-area state.

11. The executed function management method according to claim 8, further comprising:
storing an execution prohibition indication data; and
referring to said terminal storing operation management table when an instruction of execution of said one function is received, and neglecting the instruction when said one function is a function assigned with said execution prohibition indication data.

12. The executed function management method according to claim 8, further comprising:
receiving an input from a user of said mobile phone terminal;
measuring current time; and
acquiring current location data;
wherein said execution history comprises at least one of said current time, said current position data, and letters inputted through said user interface section from said user when said execution history target function or said immediate notice object function is executed.

13. The executed function management method of the mobile terminal according to claim 8, further comprising:
storing data for said terminal storing operation management table in a server storing operation management table in relation to said mobile phone terminal; and
acquiring said server storing operation management table from said server unit and setting said terminal storing operation management table based on the data of said server storing operation management table.

14. The executed function management method of the mobile terminal according to claim 8, further comprising:
receiving said execution history by an administrative mobile phone terminal.

15. A non-transitory computer-readable recording medium storing executed function management program code executed by a computer, to realize an executed function management method in an executed function management system comprising a mobile phone terminal and a server unit, said executed function management method comprising:
storing an execution history of an execution history target function, which is one of functions of said mobile phone terminal and whose execution history should be stored; and
acquiring said execution history from a mobile phone terminal to store for every said mobile phone terminal,
notifying said execution history to said server unit at preset timing or when the notification of said execution history is requested from said server unit,
storing said execution history of an immediate notice target function whose execution history should be notified to said server unit immediately upon an execution time as well as said execution history of said execution history target function in a terminal storing operation management table; and
determining whether said one function of the functions is said execution history target function or said immediate notice target function, based on said terminal storing operation management table, when said one function is executed,
wherein said storing an execution history comprises:
storing said execution history of said one function in said execution history management table when said one function is said execution history target function, and notifying said execution history of said one function to said server unit when said one function is said immediate notice target function.

16. The computer-readable recording medium according to claim 15, further comprising:
determining whether a communication connection with said server unit is possible or impossible;
storing said execution history of said immediate notice target function in said terminal execution history management table, when said immediate notice target function is executed and when the communication connection with said server unit is impossible;
extracting said execution history of said immediate notice target function from said terminal execution history management table after the communication connection with said server unit becomes possible; and
notifying the extracted execution history to said server unit.

17. The computer-readable recording medium according to claim 16, wherein said determining whether a communication connection with said server unit is possible or impossible comprises:
determining whether or not a communication connection confirmation response to a communication connection confirmation request transmitted periodically can be received from said server unit, or whether the communication connection with said server unit is possible or impossible, based on whether radio wave reception level of said mobile phone terminal is in an inside-of-area state or an outside-of-area state.

18. The recording medium of the executed function management method of the mobile terminal according to claim 15, further comprising:
storing an execution prohibition indication data; and
referring to said terminal storing operation management table when an instruction of execution of said one function is received, and neglecting the instruction when said one function is a function assigned with said execution prohibition indication data.

19. The computer-readable recording medium according to claim 15, further comprising:
receiving an input from a user of said mobile phone terminal;
measuring current time; and
acquiring current location data;
wherein said execution history comprises at least one of said current time, said current position data, and letters inputted through said user interface section from said user when said execution history target function or said immediate notice object function is executed.

20. The computer-readable recording medium according to claim 15, further comprising:

acquiring said server record operation management table from said server unit; and settings said terminal record operation management table based on data of said server record operation management table.

21. The computer-readable recording medium according to claim 15, further comprising:

receiving said execution record by said administrative mobile phone terminal.

\* \* \* \* \*